Nov. 30, 1948.                S. D. RUSSELL                 2,455,195
             COMBINATION DRAWBAR AND SUPPORT STRUCTURE
                    Original Filed April 19, 1941

INVENTOR.
Stanley D Russell
BY
Emerson B Donnell
ATTORNEY.

Patented Nov. 30, 1948

2,455,195

UNITED STATES PATENT OFFICE 2,455,195

COMBINATION DRAWBAR AND SUPPORT STRUCTURE

Stanley D. Russell, Racine, Wis., assignor to J. I. Case Company, Racine, Wis., a corporation Original application April 19, 1941, Serial No. 389,396. Divided and this application November 11, 1944, Serial No. 563,040

3 Claims. (Cl. 280—33.44)

The present invention relates to balers and an object thereof is to generally improve the construction and operation of machines of this class and an important object of the invention is to provide a construction such that the baler may be drawn through the field while operating or may be supported independently of a drawing vehicle when necessary or desirable.

Further objects will be apparent from the following description and accompanying drawings in which Figure 1 is a left side elevation of so much of a baler as necessary to illustrate the invention.

Figure 1:
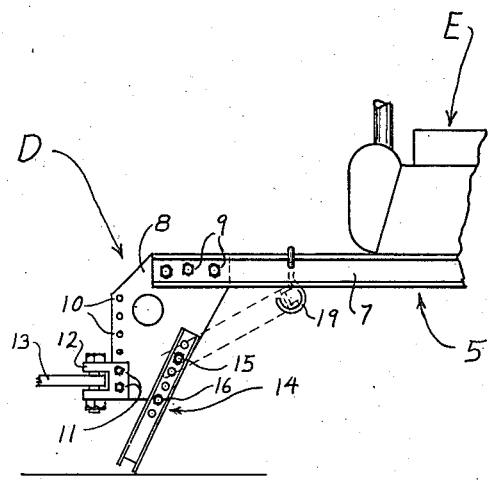
Figure 3:
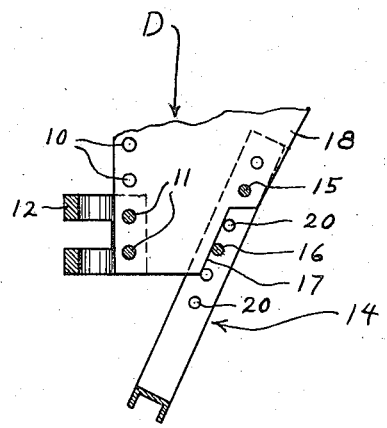
Fig. 3 is an enlarged detail of certain mechanism indicated in Fig. 1 with parts removed and others broken away to illustrate the interior construction.
Figure 2:
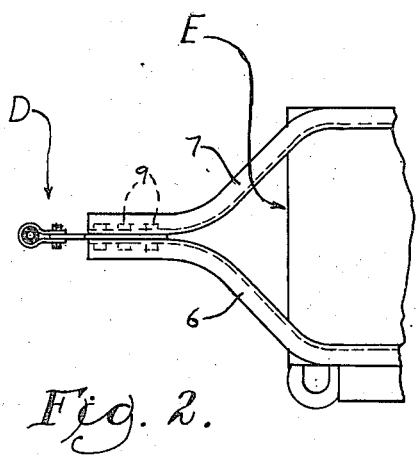
Figure 2 is a bottom plan view of the construction shown in Fig. 1, with parts removed.

The arrangement is similar to the pending application of Stanley D. Russell, Serial No. 389,396, filed April 19, 1941, now Patent No. 2,362,861, of which this is a division.

The invention is particularly applicable to a baler having a front platform generally designated as 5, in the present instance carrying an engine E which operates the baling mechanism in a manner fully disclosed in the above identified patent and which forms no part of the present invention. Platform 5 is supported by a drawbar unit generally designated as D, the rest of the baler being supported in any suitable manner for example as shown in the above identified patent.

Platform 5 preferably comprises spaced beam members 6 and 7 approaching each other forwardly of engine E and including between them a plate 8, the beams and plate being solidly united as by bolts 9—9. Plate 8 constitutes a draw element and may be provided with openings 10—10 for the reception of bolts 11—11 securing to plate 8 a fitting 12 of suitable or well-known type for engagement with a drawbar 13 of a tractor or other drawing vehicle or means not shown. It will be apparent that drawbar 13 will support, through plate 8 and platform 5, a certain portion of the weight of the complete baler, this weight being imposed upon the tractor in well-known manner. Fitting 12 may be raised or lowered by engagement of bolts 11—11 with appropriate holes 10—10 so that platform 5 will be substantially level when supported from a tractor or the like. This adjustment accommodates drawbar D to tractors of different heights. Thus the baler may be drawn through the field, partially supported on the tractor while operating to pick up and bale material directly from the field.

Platform 5 however must be supported at times when the baler is disconnected from any tractor as for example when the baler is idle or if for example it is desired to operate the baler as a stationary machine at times when the tractor is needed for other purposes. For these purposes, a stand element generally designated as 14, which may be bifurcated to engage the sides of plate 8, is pivoted to said plate by a bolt 15. A stop bolt 16 engages an edge 17 of plate 8, and which edge may be offset from edge 18 of the plate to arrest clockwise rotation of member 14 about bolt 15 and consequent downward movement of platform 5. A stable support is thereby furnished for platform 5. If the tractor drawbar is coupled to fitting 12, forward motion of the assemblage causes counterclockwise rotation of member 14 with slight lifting of platform 5 and release of member 14 from supporting relation to the ground and plate 8. Member 14 may be readily swung upwardly to the dotted position in Fig. 1 and retained by any suitable means such as a hook 19. Additional holes as 20—20 may be provided in member 14 to adjust the latter for leveling platform 5 to suit conditions. For example, if the machine is to be used for stationary baling and at the most convenient location the ground is not level, member 14 may be adjusted so that the machine will rest substantially lower on the slanted ground. The machine may be operated in the above described manner and material to be baled forked directly into the feeding mechanism not shown.

The above being a complete description of an illustrative embodiment of the invention, what is claimed as new and desired to be secured by Letters Patent of the United States is:

1. In a baler having a body portion the combination of a front platform including spaced beam members and a vertically extending plate secured therebetween and projecting beyond the margins thereof, means on the plate for attaching the draw bar of a propelling vehicle and an upwardly open U-shaped stand element swingably mounted on the plate and having opposed side portions engaging opposite surfaces of said plate, stop means on the plate, said stand element being swingable downwardly from an upper inoperative position through a vertical position to a downwardly inclined position resting against said stop means whereby the weight of the baler tends to further swing said stand element, said stop portion being positioned to be engaged by said stand element to prevent further swinging of said stand element.

2. A structure as claimed in claim 1 in which the plate is provided with a plurality of means for securing the draw bar attaching means in any one of a plurality of positions.

3. A structure as defined in claim 2 in which the stand element is provided with a plurality of means for swingably attaching said stand element to said plate in any one of a plurality of positions.

STANLEY D. RUSSELL.

REFERENCES CITED

The following references are of record in the file of this patent:

UNITED STATES PATENTS

| Number | Name | Date |
| --- | --- | --- |
| 1,183,880 | Johnston | May 23, 1916 |
| 1,361,166 | Miller | Dec. 7, 1920 |
| 1,504,244 | Howell | Aug. 12, 1924 |
| 2,207,812 | McClellan | July 16, 1940 |

FOREIGN PATENTS

| Number | Country | Date |
| --- | --- | --- |
| 497,390 | Great Britain | Dec. 15, 1938 |
| 513,598 | Great Britain | Oct. 17, 1939 |